(12) United States Patent
Moyer

(10) Patent No.: US 7,831,818 B2
(45) Date of Patent: Nov. 9, 2010

(54) EXCEPTION-BASED TIMER CONTROL

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 527 days.

(21) Appl. No.: 11/765,891

(22) Filed: Jun. 20, 2007

(65) Prior Publication Data

US 2008/0320290 A1    Dec. 25, 2008

(51) Int. Cl.
G06F 9/00    (2006.01)
(52) U.S. Cl. .................................... 712/244
(58) Field of Classification Search .................. 712/244
See application file for complete search history.

(56) References Cited

U.S. PATENT DOCUMENTS

| | | | |
|---|---|---|---|
| 4,090,239 A * | 5/1978 | Twibell et al. .............. | 713/502 |
| 4,926,319 A | 5/1990 | Wilkie et al. | |
| 5,392,052 A * | 2/1995 | Eberwine ............... | 342/357.09 |
| 5,541,943 A | 7/1996 | Niescier et al. | |
| 5,568,649 A * | 10/1996 | MacDonald et al. .......... | 710/48 |
| 5,740,451 A * | 4/1998 | Muraki et al. ............... | 710/260 |
| 5,751,735 A | 5/1998 | Tobin et al. | |
| 5,812,830 A | 9/1998 | Naaseh-Shahry et al. | |
| 6,145,103 A * | 11/2000 | Typaldos et al. .............. | 714/55 |
| 6,553,513 B1 * | 4/2003 | Swoboda et al. .............. | 714/28 |
| 6,601,189 B1 | 7/2003 | Edwards et al. | |
| 6,658,555 B1 | 12/2003 | Kahle et al. | |
| 6,839,654 B2 | 1/2005 | Rollig et al. | |
| 6,986,026 B2 | 1/2006 | Roth et al. | |
| 7,073,097 B2 | 7/2006 | Kuwayama | |
| 7,159,144 B2 | 1/2007 | Babu et al. | |
| 7,162,410 B1 | 1/2007 | Nemecek et al. | |
| 7,334,161 B2 | 2/2008 | Williams et al. | |
| 2003/0126502 A1 | 7/2003 | Litt | |
| 2004/0260913 A1 | 12/2004 | Babu et al. | |
| 2006/0117224 A1 | 6/2006 | Wu | |
| 2007/0053301 A1 * | 3/2007 | Maruoka et al. ............ | 370/244 |
| 2007/0198759 A1 * | 8/2007 | Agarwal ..................... | 710/260 |
| 2008/0184055 A1 | 7/2008 | Moyer et al. | |
| 2008/0184056 A1 | 7/2008 | Moyer et al. | |

OTHER PUBLICATIONS

International Search Report for corresponding PCT Application No. PCT/US08/64200 mailed Oct. 28, 2008.
U.S. Appl. No. 11/668,780, filed Jan. 30, 2007 entitled "Instruction-Based Timer Control During Debug".
"MC68HC912D60A/D", Rev. 3.1, Freescale Semiconductor,Inc., Aug. 2005, pp. 74-77; 140; 168-174; 223-262; 370-403.

(Continued)

Primary Examiner—Eddie P Chan
Assistant Examiner—Idriss N Alrobaye

(57) ABSTRACT

A processing device includes a timer and an exception controller configured to provide an exception indicator representative of a first exception. The processing device further includes a timer controller configured to selectively enable/disable the timer in response to the exception and based on a characteristic of the exception. A method of utilizing the processing device includes receiving an exception and determining a characteristic of the exception. The method further includes, at a first time, selectively enabling/disabling the timer of the processing device based on the characteristic, and, at a second time subsequent to the first time, accessing a count value stored at the timer. The method further includes providing the count value for output from the processing device.

17 Claims, 2 Drawing Sheets

OTHER PUBLICATIONS

U.S. Appl. No. 11/668,780, Office Action mailed May 4, 2009.
U.S. Appl. No. 11/668,787, Office Action mailed May 19, 2009.
U.S. Appl. No. 11/668,787, Final Office Action mailed Feb. 24, 2010, 13 pages.
U.S. Appl. No. 11/668,780, Notice of Allowance mailed Nov. 13, 2009, 6 pages.
U.S. Appl. No. 11/668,780, Office Action mailed Apr. 5, 2010, 15 pages.
Notice of Allowance mailed Aug. 10, 2010 for U.S. Appl. No. 11/668,780, 6 pages.
Notice of Allowance mailed Jun. 30, 2010 for U.S. Appl. No. 11/668,787, 14 pages.

* cited by examiner

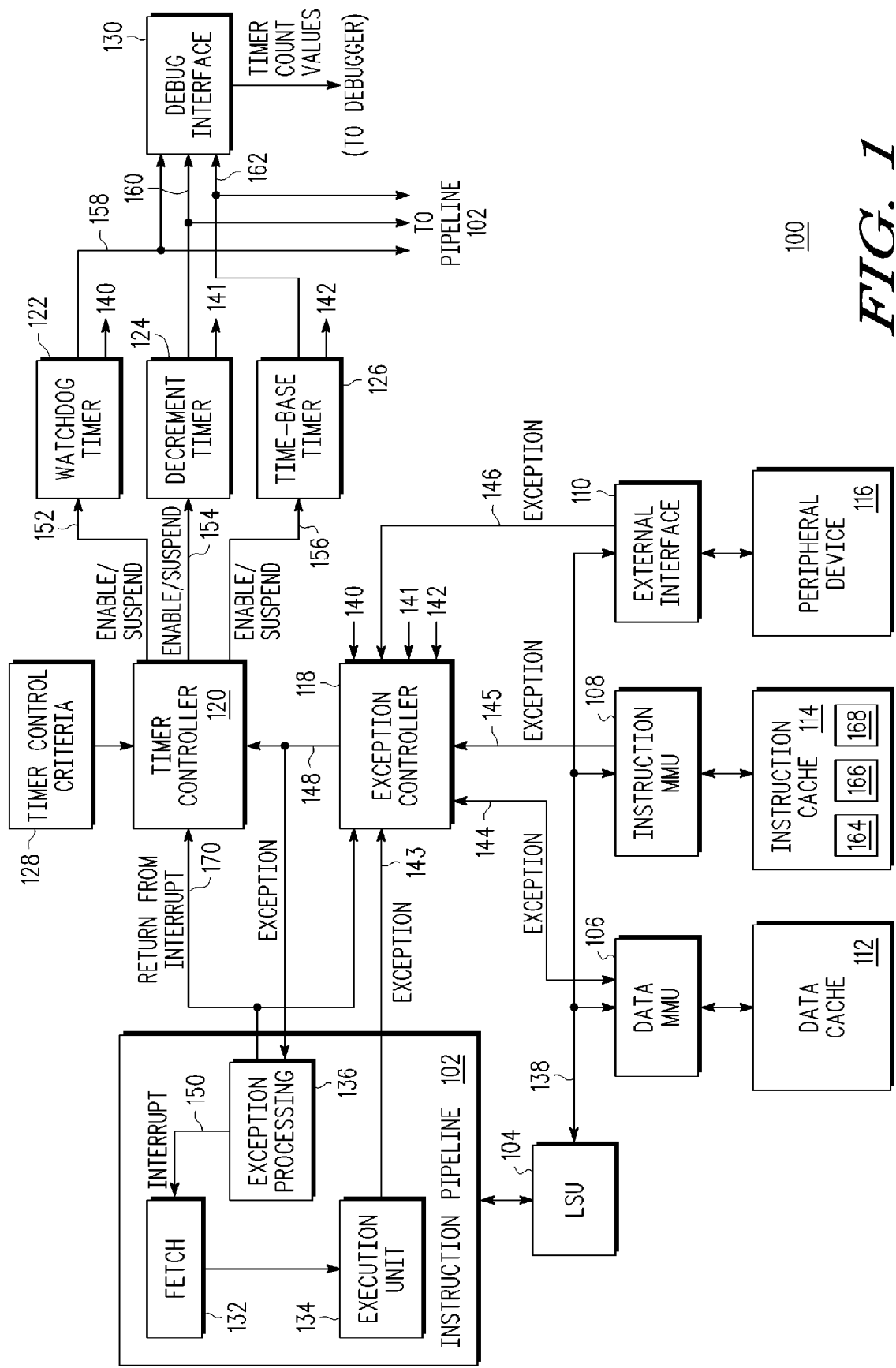

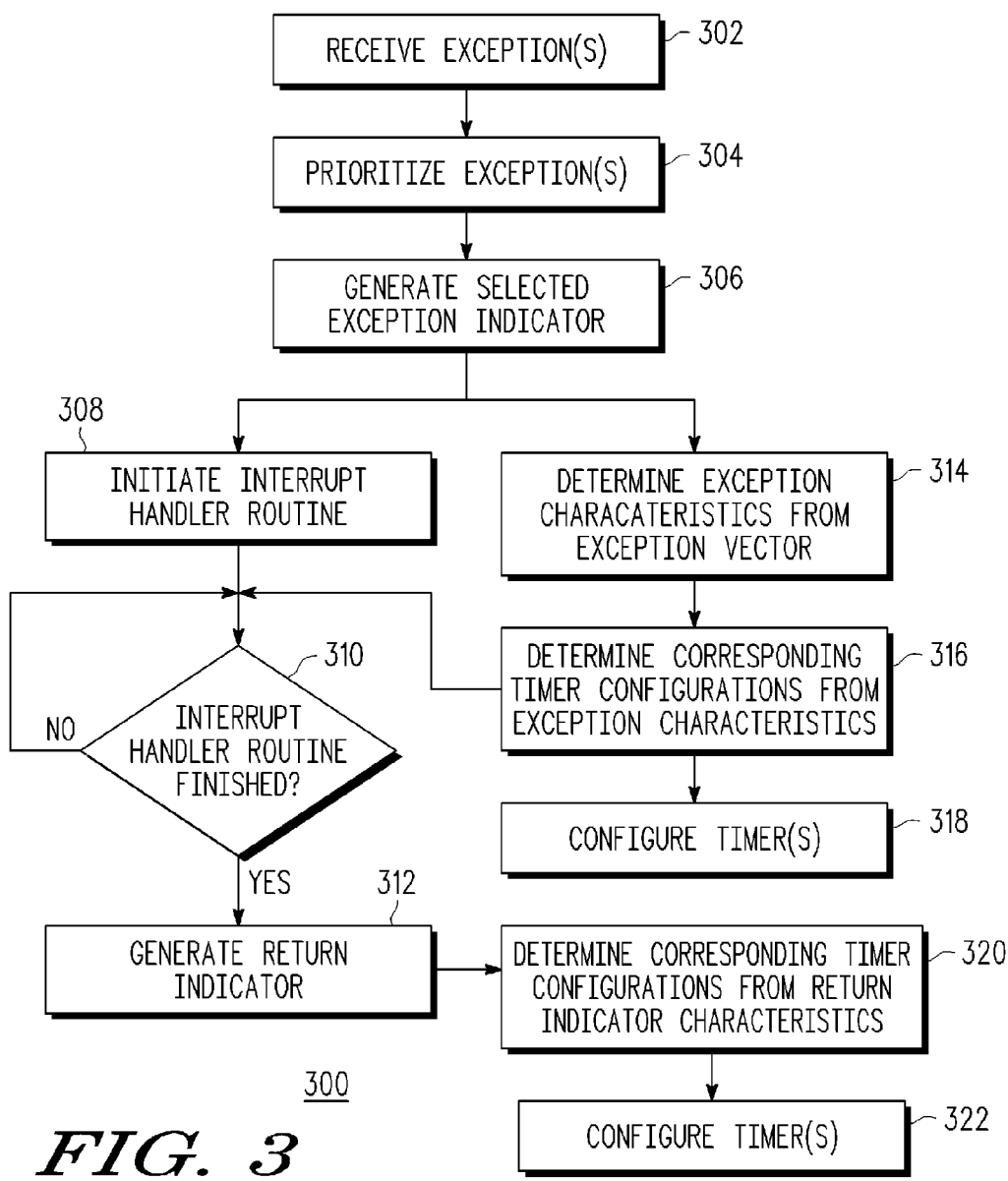

EXCEPTION-BASED TIMER CONTROL

FIELD OF THE DISCLOSURE

The present disclosure relates generally to processing devices and more particularly to timer control in processing devices.

BACKGROUND

Processing devices, such as central processing units (CPUs), often implement one or more timers to control operations to provide periodic stimuli during normal operations or to facilitate the measurement of certain performance characteristics. However, interruptions to normal program flow due to exceptions often can negatively affect correct timer operation. For instance, when a conventional CPU enters an interrupt handling routine to handle an exception, the timers of the CPU typically continue to operate unless explicitly disabled after entering the handler by performing writes to control registers associated with the timers. Likewise, when the CPU exits the interrupt handling routine, the timers disabled for the interrupt handling routine typically are reenabled by performing writes to the control registers associated with the timers. However, the number of clock cycles needed to perform these write operations may vary due to a variety of factors and thus may introduce a non-deterministic error into the timer values. This non-deterministic error factor can make it difficult to adequately characterize certain process profiling characteristics under test. Further, the write operations themselves consume processing cycles, thereby reducing overall processing efficiency. Accordingly, an improved technique for controlling timers in response to exceptions in a processing device would be advantageous.

BRIEF DESCRIPTION OF THE DRAWINGS

The present disclosure may be better understood and its numerous features and advantages made apparent to those skilled in the art by referencing the accompanying drawings. The use of the same reference symbols in different drawings indicates similar or identical items.

FIG. 1 is a block diagram illustrating a processing device using exception-based timer control in accordance with at least one embodiment of the present disclosure.

FIG. 2 is a flow diagram illustrating a method for configuring the timer control criteria of the processing device of FIG. 1 in accordance with at least one embodiment of the present disclosure.

FIG. 3 is a flow diagram illustrating a method for exception-based timer control in accordance with at least one embodiment of the present disclosure

DETAILED DESCRIPTION

In accordance with one aspect of the present disclosure, a processing device is provided. The processing device includes a timer and an exception controller configured to provide an exception indicator representative of a first exception. The processing device further includes a timer controller configured to selectively enable/disable the timer in response to the exception and based on a characteristic of the exception.

In accordance with another aspect of the present disclosure, a method includes receiving an exception at a processing device and determining a characteristic of the exception. The method further includes, at a first time, selectively enabling/disabling a timer of the processing device based on the characteristic, and, at a second time subsequent to the first time, accessing a count value stored at the timer. The method further includes providing the count value for output from the processing device.

FIGS. 1-3 illustrate example techniques for controlling one or more timers of a processing device in response to the exceptions generated in the course of operation of a processing device. In one embodiment, an exception is generated in response to a processor operation and the exception is selected for provision as an interrupt at a processor core. In response to the interrupt, an interrupt handling routine is invoked at the processor core. Further, certain characteristics of the exception are determined and one or more timers are selectively enabled or disabled (hereinafter, "selectively enabled/disabled") based on one or more of the characteristics of the exception. These characteristics can include, but are not limited to, the type of exception, the source of the exception, and the interrupt handler routine specified to be processed in response to the exception, such as in the case of a software or hardware vectored interrupt, based on the supplied interrupt vector. Although a number of example exception characteristics have been described, other exception characteristics, individually or in combination, can be utilized to selectively enable/disable one or more timers without departing from the scope of the present disclosure Additionally, in preparation for, or in response to, termination of the interrupt handler routine, the timers can be selectively enabled/disabled based on the exception characteristics. In one embodiment, the timers are reconfigured upon termination of the interrupt handler routine to return the timers to their original state at the time at which the exception was invoked. Further, the count values of some or all of the timers can be accessed and provided for output from the processing device so as to facilitate profiling the operation of the processing device.

FIG. 1 illustrates a processing device 100 implementing an exception-based timer control mechanism in accordance with at least one embodiment of the present disclosure. In the depicted example, the processing device 100 includes an instruction pipeline 102, a load store unit (LSU) 104, a data memory management unit (MMU) 106, an instruction MMU 108, an external interface 110, a data cache 112, an instruction cache 114, and one or more peripheral devices (e.g., peripheral device 116). The peripheral device 116 can include any of a variety of peripheral devices, such as a bus interface, a keyboard interface, a mouse interface, a display controller, a memory controller, and the like. The processing device 100 further includes an exception controller 118, a timer controller 120, a timer control criteria 128, a debug interface 130, and one or more timers, such as a watchdog timer 122, a decrement timer 124, and a time-base timer 126 (hereafter "timers 122-126").

The watchdog timer 122, in one embodiment, includes a timer that is configured to initiate a system reset in the event that its timer value reaches a threshold value (e.g., zero). Accordingly, during normal program flow, the processing device 100 is configured to periodically refresh the timer value of the watchdog timer 122 so as to prevent it from reaching the threshold value. The decrement timer 124, in one embodiment, is configured to decrement a value when enabled until a threshold value is reached, at which time the decrement timer 124 generates an exception. The periodic exception generated by the decrement timer 124 can be used, for example, by an operating system as a "time tick." The time-base timer 126, in one embodiment, continually increments (or decrements) its timer value when enabled and typically serves as a representation of time for real-time-based applications, and can be optionally used as a source of timer interrupts.

The count value of each of the timers 122-126 is accessible via the debug interface 130 and to the instruction pipeline 102. The debug interface 130 can include any of a variety of standard or proprietary debug interface configurations used to interface with an external debug device. To illustrate, in one embodiment, the external debug interface 130 includes a test access port (TAP) substantially compliant with the Institute of Electrical and Electronic (IEEE) 1149.1 standard (also referenced as the Joint Test Action Group (JTAG) standard). The interface of the timers 122-126 with the instruction pipeline 102 allows for application or operating system software to utilize the timers for a variety of control or measurement functions.

The timer controller 120 is coupled with the timer control criteria 128, the selected exception indicator 148 (e.g., an exception vector), and a return-from-interrupt indicator (hereinafter, "interrupt return indicator 170") (e.g., a return vector) from the exception processing component 136. The timer control criteria 128 includes configuration information that can be utilized by the timer controller 120, in conjunction with exception characteristics or interrupt termination characteristics, to determine which of the timers is to be selectively enabled or disabled. The timer controller 120 also includes outputs to provide enable/disable signals 152, 154, and 156 (hereafter "enable/disable signals 152-156") to the watchdog timer 122, the decrement timer 124, and the timebase timer 126, respectively. In one embodiment, for each exception to be processed, the timer controller 120 is operable to interact with the timer control criteria 128 to determine based on the selected exception indicator 148 which of the timers are to be enabled and which timers are to be disabled during the duration of the interrupt handler routine, and then assert or de-assert each of the enable/disable signals 152-156, accordingly, so as to independently disable or enable the watchdog timer 122, the decrement timer 124, and the timebase timer 126. The enable/disable signals 152-156 can enable or disable the corresponding timers 122-126 using clock gating, the removal or reduction of power to the timers 122-126, and the like.

In one embodiment, the count value of one or more of the timers 122-126 is available to be received by the instruction pipeline 102 and the debug interface 130. In this way, a count value can be obtained prior to the termination of an interrupt handler routine. Likewise, a count value can be obtained subsequent to the termination of an interrupt handler routine. In either case the timer controller 120 can continue to act to selectively enable/disable the timers.

The instruction pipeline 102 comprises a plurality of stages for fetching, processing, and executing instructions represented by instruction data stored in the instruction cache 114 and using data from the data cache 112. The stages include an instruction fetch component 132 and an execution unit 134. The instruction pipeline 102 further includes an exception processing component 136 for processing invoked exceptions.

The processing device 100 executes instructions loaded into the instruction fetch component 132 from the instruction cache 114 via the instruction MMU 108. The LSU 104 is configured to facilitate load and store operations to and from memory and peripheral devices resulting from the fetching, processing, and execution of instructions by the instruction pipeline 102.

As illustrated in FIG. 1, the exception controller 118 receives exception indicators 140, 141, 142, 143, 144, 145, and 146 (hereinafter, "exception indicators 140-146") from some or all of the components in response to the invocation of an exception at the corresponding component. In the illustrated example, the timers 122-126 can generate exception indicators 140, 141, and 142, respectively, based on their respective operations. To illustrate, the watchdog timer 122 can generate the exception indicator 140 in response to its count value reaching a predefined value (e.g., zero), thereby signaling a watchdog event to the instruction pipeline. The execution unit 134 provides the exception indicator 143 in response to an exception involving the execution of instructions at the execution unit 134, such as execution of a trap or service call instruction, detection of an illegal instruction, detection of a processing error associated with execution of an instruction (such as an overflow condition), as well as other instruction execution related exception conditions. The data MMU 106 provides the exception indicator 144 in response to an exception involving the data MMU 106, such as a permission violation condition, a page fault condition for a data access, and the like. The instruction MMU 108 provides the exception indicator 145 in response to an exception involving the instruction MMU 108, such as such a permission violation condition, a page fault condition for a data access, or the like. The external interface 110 provides the exception indicator 146 in response to an exception involving the external interface 110, such as a bus error exception, a bus-timeout condition, as well as other externally detected error conditions associated with accesses external devices such as peripherals or main memory. Each of the exception indicators 140-146 can be provided to the exception controller 118 by, for example, writing a corresponding value to a control register associated with the exception controller 118, by asserting an exception input at the exception controller 118 associated with the corresponding component, by providing a multiple-bit vector associated with the corresponding exception to corresponding input of the exception controller 118, or a combination thereof.

When one or more of the exception indicators 140-146 are provided, the exception controller 118 identifies one or more particular characteristics associated with the exception resulting in the exception indicator, such as the source of the exception (e.g., from the data MMU 106, from the instruction MMU 108, from the execution unit 134, etc.), the type of exception, and the like. If the exception is permitted as an interrupt to the instruction pipeline 102, i.e., the particular exception is enabled, and has sufficient priority to be processed, the exception controller 118 then generates a selected exception indicator 148 based on the identified exception characteristics and provides the selected exception indicator 148 to the timer controller 120 and to the exception processing component 136. The selected exception indicator 148 is representative of the exception and can include information representative of the data characteristics. The selected exception indicator 148 can be provided by writing a value representative of the selected exception indicator 148 to a control register associated with the timer controller 120 or the exception processing component 136 by configuring a multiple-line bus between the exception controller 118, the timer controller 120, and the exception processing component 136 to carry a multiple-bit value representative of the selected exception indicator 148, and the like.

During the course of execution of instructions of a program flow, any of a variety of exceptions can occur for a variety of reasons. For example, an exception can occur as a result of a trigger by an external device (which causes an external input interrupt or a critical input interrupt), cache locking, a parity error signal on a cache access, an overflow condition, detection of an illegal instruction, a permission violation, a privilege exception, an external interrupt request, a bus error exception, a debug request exception, an instruction storage interrupt, a data storage interrupt, an instruction TLB (translation lookaside buffer, contained within instruction MMU 108) interrupt, a data TLB interrupt, as well as other exceptions typically encountered in a data processing system.

In the advent that multiple exception indicators are received concurrently, the exception controller 118, in one embodiment, prioritizes or otherwise selects the exceptions for sequential processing based on any of a variety of factors, such as the exception characteristics, the processing state of the instruction pipeline 102, and the like. In one embodiment, the exception characteristics that may be used to determine priority of exceptions can include critical/non-critical, precise/imprecise, and synchronous/asynchronous information in addition to the source of the exception, the type of exception, and the like. As an example, such types and sources may include whether the exception is an external input type, data storage type, or if the source of an external input exception is a keyboard, or the like.

In response to receiving the selected exception indicator 148 from the exception controller 118, the exception processing component 136 generates an interrupt 150 and selects an interrupt handling routine from a plurality of interrupt handling routines (e.g., interrupt handling routines 164, 166 and 168 stored in the instruction cache 114 or in read-only memory (ROM), or main memory (not shown) based on the selected exception indicator 148. The exception processing component 136 then saves the current state of the processing device 100 and switches the flow of instruction pipeline 102 from the current program flow to the selected interrupt handling routine. The instruction pipeline 102 fetches instructions associated with the interrupt handling routine and executes the instructions to process the interrupt generated by the exception processing component 136. As the interrupt handling routine terminates at the instruction pipeline 102, the exception processing component 136 generates the interrupt return indicator 170 and provides the interrupt return indicator 170 to the timer controller 120 and the exception controller 118. In response to the interrupt return indicator 170, the exception controller 118 can select the next exception, if any, for processing, or can return to normal instruction processing. Note that the interrupt return indicator 170 can be alternately comprised of individual return indicators, each of which is indicative of a particular type of return, and that may represent execution of a return from interrupt instruction with selected criteria and exception identifier information, such as a return from external interrupt, return from debug interrupt, return from critical interrupt, and the like.

The interrupt return indicator 170 can include an indicator of characteristics associated with the exception that caused the invocation of the interrupt handling routine, characteristics associated with the invoked interrupt handling routine, or a combination thereof. To illustrate, the interrupt return indicator 170 can indicate an exception identifier, an exception type, an exception source, an interrupt handling routine identifier, an interrupt handling routine type, and the like. The interrupt return indicator 170 can be provided by writing a value to a control register associated with the exception controller 118 or the timer controller 120, by providing a corresponding value on a multiple-bit bus, by execution of a particular return from interrupt-class instruction, and the like.

In one embodiment, the timer controller 120 can use any of a variety of exception characteristics for the purposes of enabling or disabling a timer. The timer controller 120, using the timer control criteria 128, can identify which of the timers 122-126 are to be enabled, or disabled, depending on the exception type. In another embodiment, the selected exception indicator 148 can include the source of the exception (e.g., a keyboard for an external input exception) and the timer controller 120 can utilize the selected exception indicator 148 with the timer control criteria 128 to identify which of the timers 122-126 are to be enabled, or disabled, in response to the selected exception indicator 148 (and thus in response to the initiation of processing of the selected exception represented by the selected exception indicator 148). In yet another embodiment, the selected exception indicator 148 can include information about the interrupt handler routine invoked (e.g., an interrupt handler routine identifier, an interrupt handler routine type, etc.) in response to the selected exception indicator 148 and the timer controller 120, using the timer control criteria 128, can identify which of the timers are to be enabled, or disabled, depending on the interrupt handler routine characteristics.

The timer controller 120 further can selectively enable/disable one or more of the timers 122-126 in response to the termination of an interrupt handler routine. In response to the interrupt return indicator 170 generated by the exception processing component 136, the timer controller 120 can use the characteristics of the corresponding exception or the corresponding interrupt handler routine to selectively enable/disable the timers 122-126 based on the timer control criteria 128.

In one embodiment, the timer control criteria 128 can be implemented as one or more programmable control registers, such as an Interrupt Freeze Timer Control Register (IFTCR) and an Interrupt Unfreeze Timer Control Register (IUFTCR). The timer controller 120 can utilize either or both of the IFTCR and the IUFTCR to control the operation of the timers 122-126 during interrupt processing. Tables 1 and 2 illustrate example formats of the IFTCR and the IUFTCR registers, respectively, for controlling the operation of a decrement timer 124 and a time-based timer 126.

TABLE 1

IFTCR FORMAT

| Bit(s) | Name | Description |
|---|---|---|
| 0:9 | — | Reserved |
| 10 | ISIFDEC | Instruction Storage Interrupt (ISI) - freeze decrement timer |
| | | 0 - ISI does not affect decrement timer |
| | | 1 - ISI causes decrement timer to freeze |
| 11 | DSIFDEC | Data Storage Interrupt (DSI) - freeze decrement timer |
| | | 0 - DSI does not affect decrement timer |
| | | 1 - DSI causes decrement timer to freeze |

TABLE 1-continued

IFTCR FORMAT

| Bit(s) | Name | Description |
| --- | --- | --- |
| 12 | ITLBFDEC | Instruction TLB Error Interrupt (ITLB) - freeze decrement timer<br>0 - ITLB does not affect decrement timer<br>1 - ITLB causes decrement timer to freeze |
| 13 | DTLBFDEC | Data TLB Error Interrupt (DTLB) - freeze decrement timer<br>0 - DTLB does not affect decrement timer<br>1 - DTLB causes decrement timer to freeze |
| 14 | EIFDEC | External Input Interrupt - freeze decrement timer<br>0 - External Input interrupt does not affect decrement timer<br>1 - External Input interrupt causes decrement timer to freeze |
| 15 | CIFDEC | Critical Input Interrupt -freeze decrement timer<br>0 - Critical Input interrupt does not affect decrement timer<br>1 - Critical Input interrupt causes decrement timer to freeze |
| 16:25 | — | Reserved |
| 26 | ISIFTB | Instruction Storage Interrupt - freeze time-base timer<br>0 - ISI does not affect time-base timer<br>1 - ISI causes time-base timer to freeze |
| 27 | DSIFTB | Data Storage Interrupt - freeze time-base timer<br>0 - DSI does not affect time-base timer<br>1 - DSI causes time-base timer to freeze |
| 28 | ITLBFTB | Instruction TLB Error Interrupt - freeze time-base timer<br>0 - ITLB does not affect time-base timer<br>1 - ITLB causes time-base timer to freeze |
| 29 | DTLBFTB | Data TLB Error Interrupt - freeze time-base timer<br>0 - DTLB does not affect time-base timer<br>1 - DTLB causes time-base timer to freeze |
| 30 | EIFTB | External Input Interrupt - freeze time-base timer<br>0 - External Input interrupt does not affect time-base timer<br>1 - External Input interrupt causes time-base timer to freeze |
| 31 | CIFTB | Critical Input Interrupt - freeze time-base timer<br>0 - Critical Input interrupt does not affect time-base timer<br>1 - Critical Input interrupt causes time-base to freeze |

TABLE 2

IUFTCR FORMAT

| Bit(s) | Name | Description |
| --- | --- | --- |
| 0:9 | — | Reserved |
| 10 | ISIUFDEC | Instruction Storage Interrupt - unfreeze decrement timer<br>0 - ISI does not affect decrement timer<br>1 - ISI causes decrement timer to unfreeze |
| 11 | DSIUFDEC | Data Storage Interrupt - unfreeze decrement timer<br>0 - DSI does not affect decrement timer<br>1 - DSI causes decrement timer to unfreeze |
| 12 | ITLBUFDEC | Instruction TLB Error Interrupt - unfreeze decrement timer<br>0 - ITLB does not affect decrement timer<br>1 - ITLB causes decrement timer to unfreeze |
| 13 | DTLBUFDEC | Data TLB Error Interrupt - unfreeze decrement timer<br>0 - DTLB does not affect decrement timer<br>1 - DTLB causes decrement timer to unfreeze |
| 14 | EIUFDEC | External Input Interrupt - unfreeze decrement timer<br>0 - External Input interrupt does not affect decrement timer<br>1 - External Input interrupt causes decrement timer to unfreeze |
| 15 | CIUFDEC | Critical Input Interrupt - unfreeze decrement timer<br>0 - Critical Input interrupt does not affect decrement timer<br>1 - Critical Input interrupt causes decrement timer to unfreeze |
| 16:25 | — | Reserved |
| 26 | ISIUFTB | Instruction Storage Interrupt - unfreeze time-base timer<br>0 - ISI does not affect time-base timer<br>1 - ISI causes time-base timer to unfreeze |
| 27 | DSIUFTB | Data Storage Interrupt - unfreeze time-base timer<br>0 - DSI does not affect time-base timer<br>1 - DSI causes time-base timer to unfreeze |
| 28 | ITLBUFTB | Instruction TLB Error Interrupt - unfreeze time-base timer<br>0 - ITLB does not affect time-base timer<br>1 - ITLB causes time-base timer to unfreeze |
| 29 | DTLBUFTB | Data TLB Error Interrupt - unfreeze time-base timer<br>0 - DTLB does not affect time-base timer<br>1 - DTLB causes time-base timer to unfreeze |

TABLE 2-continued

IUFTCR FORMAT

| Bit(s) | Name | Description |
| --- | --- | --- |
| 30 | EIUFTB | External Input Interrupt - unfreeze time-base timer<br>0 - External Input interrupt does not affect time-base timer<br>1 - External Input interrupt causes time-base timer to unfreeze |
| 31 | CIUFTB | Critical Input Interrupt - unfreeze time-base timer<br>0 - Critical Input interrupt does not affect time-base timer<br>1 - Critical Input interrupt causes time-base to unfreeze |

As Table 1 illustrates, each of a plurality of bit positions of the IFTCR register can be associated with a corresponding combination of timer type and exception type, wherein the bit value at the bit position indicates whether the timer controller 120 is to maintain the corresponding timer in the same state as it was at the time of the exception or to disable (or "freeze") the timer (if not already disabled) in response the invocation of an exception of the corresponding exception type. To illustrate, bit position 14 of Table 1 is associated with the control field EIFDEC, which controls whether the decrement timer 124 is suspended (if not already suspended) in response to an external input-type exception. If the bit value is a "0" the decrement timer 124 is maintained in its present state in the event that the selected exception indicator 148 indicates that an external input-type exception has occurred and has triggered an interrupt, whereas if the bit value is a "1" the decrement timer 124 is disabled (or "frozen") in the event that the selected exception indicator 148 indicates that an external input-type exception has occurred and has triggered an interrupt.

As illustrated by Table 2, each of the plurality of bit positions of the IUFTCR register are likewise associated with a corresponding combination of timer type and exception type, wherein the bit value at the bit position indicates whether the timer controller 120 is to maintain the corresponding timer in the same state as it was at the time of the exception or to enable (or "unfreeze") the timer (if not already enabled) in response to an invocation of an exception of the corresponding exception type. To illustrate, bit position 14 of Table 2 is associated with the control field EIUFDEC, which controls whether the decrement timer 124 is enabled (if not already enabled) in response to an external input-type exception. If the bit value is a "0," the decrement timer 124 is maintained in its present state in the event that the selected exception indicator 148 indicates that an external input-type exception has occurred and has triggered an interrupt, whereas if the bit value is a "1" the decrement timer 124 is enabled in the event that the selected exception indicator 148 indicates that an external input-type exception has occurred and has triggered an interrupt Thus, the IFTCR register is used to selectively disable timers, whereas the IUFTCR register is used to selectively enable timers.

The timer controller 120, in one embodiment, is implemented as a logic device (e.g., a state machine) whereby upon receipt of a selected exception indicator 148, the timer controller 120 accesses the timer control criteria 128. The timer controller 120 also can comprise a storage component that is used to store the states of the timers 122-126 prior to the execution of an interrupt handler routine. As described above, the timer control criteria 128 can be implemented as one ore more programmable registers, such as the IFTCR and the IUFTCR described above. To determine whether a timer is to be disabled, the timer controller 120 accesses an appropriate bit of the IFTCR based on one or more characteristics (e.g., exception type, exception source, interrupt handler routine invoked by the exception) of the selected exception indicator 148 and the type of timer. If the corresponding bit stores a "1," indicating the timer is to be disabled, and the timer is currently enabled, the timer controller 120 deasserts the corresponding one of the enable/disable signals 152-156. Otherwise, the timer controller 120 maintains the corresponding one of the enable/disable signal in its current state. For example, when the relevant exception characteristics comprise the exception type and the exception type for an invoked exception is an external interrupt, the timer controller 120 accesses the relevant bit of the IFTCR based on the characteristics of the selected exception indicator 148 (i.e., the EIFDEC field) to determine whether the decrement timer 124 is to be disabled. If the EIFDEC bit is a "1," the timer controller 120 deasserts the enable/disable signal 154, otherwise the enable/disable signal 154 is kept in its current state.

Alternatively, the IUFTCR register is accessed by the timer controller 120 to determine which of the timers 122-126 are to be enabled and which of the timers 122-126 are to be maintained in their current state. For each of the timers 122-126, the timer controller 120 accesses the relevant bit of the IUFTCR based on the timer type and the characteristics of the selected exception indicator 148. The timer controller 120 asserts the corresponding one of the enable/disable signals 152-156 for the timer when the relevant bit is "1." Otherwise, the timer controller 120 maintains the corresponding enable/disable signal in its current state. One will appreciate that, in the embodiments described, the IFTCR and IUFTCR are not permitted to conflict so as to both enable and disable a timer simultaneously.

The timer controller 120 may also use the timer type and interrupt return indicator 170 to selectively enable/disable each of the timers 122-126. In an analogous manner to the way the timer controller 120 selectively enables/disables the timers 122-126 based on selected exception indicator 148 information, for example, in response to an interrupt return indicator 170, the timer controller 120 accesses the IFTCR and the IUFTCR of the timer control criteria 128 to determine which of the timers 122-126 are to be disabled or enabled, respectively, based on the timer type and the characteristics of the interrupt return indicator 170. Alternatively, the timer controller 120, can access a storage component in which the state of each timer was stored prior to the execution of the interrupt handler routine. This storage component can be used so that, in response to interrupt return indicator 170, the timers 122-126 are returned to the state they were in prior to the execution of the interrupt handler routine. The storage component can include a plurality of bits, whereby the timer controller 120 programs one bit for each timer as either "1" or "0" for enabled or disabled, respectively. Then in response to the interrupt return indicator 170, the timer controller 120, for each timer, accesses the appropriate bit and enables the corresponding timer when the bit is a "1" or disables the timer when the bit is a "0."

FIG. 2 illustrates an example method 200 for configuring the timer control criteria 128 in accordance with at least one embodiment of the present disclosure. For ease of discussion, the method 200 is described in the context of the timer control criteria 128 and the processing device 100 of FIG. 1.

At block 202, the method 200 includes determining the desired timer configurations corresponding to various exception characteristics. The desired timer configurations, in one embodiment, serve as control information that is utilized to control the selective enabling/disabling of the timers 122-126 in response an enabled exception having the corresponding characteristics, in response to a return from an interrupt, or a combination thereof. As described above, the timer configurations can be implemented as one or more control registers, such as the IFTCR register and the IUFTCR register described above.

The particular timer control configuration for a corresponding exception characteristic can vary depending on the intended operation. To illustrate, if a user program is utilizing the time-base timer 126 to profile the execution characteristics of one or more portions of a software application, in order to determine the amount of time spent in execution, it is not desirable to require that interrupts be disabled during the measurement. However, in prior art systems, if an interrupt occurs during execution of the software application, the instruction execution flow will be re-directed to handling the interrupt, and the time-base timer 126 will continue to operate unless explicitly disabled by interrupt handler software. After returning to the software application after the interrupt handler has completed execution, the count value of the time-base timer 126 will not be the same as it would have been had no interrupt occurred. Thus, the software application will retrieve an erroneous value, and will incorrectly assume that the additional time indicated by the timer value was actually consumed by the software application, leading to erroneous operation. For the watchdog timer 122, however, it may not be desirable to disable the timer while the interrupt handler is executing, since it may still be responsible for ensuring that a pre-determined interval is not exceeded prior to managing the watchdog timer, even in the presence of interrupts.

To summarize, in prior art systems, when a processing device enters an interrupt handler, there are multiple timer resources that continue to operate unless explicitly disabled some time after entering the handler. In many processing systems, disabling a timer involves writing to a control register to cease the counting of the individual timers. At the end of the interrupt handler routine, prior to returning the processing device back to the normal execution mode of an application, the timers must be explicitly re-enabled by writing to the control registers. The disablement of a timer via writing to a register can require multiple clock cycles to perform. Also, the time spent in processing the exception in preparation for entering the interrupt handler as well as executing the instructions needed to disable or enable a timer can take many cycles as well. This can cause issues for application-level software. If application code is utilizing a timer resource to perform profiling or other load-measuring algorithms, interrupts can cause an error factor (which can be non-deterministic) to be introduced. Other timers in the system may need to continue to operate unimpeded in the presence of interrupt handling.

In many cases it is desirable to measure the amount of processor resources (e.g., loading) consumed by interrupt handling routine during normal operation of the data processor, in order to determine the effect on normal execution throughput. In such cases, the timer control criteria 128 may specify that a normally disabled timer to become unfrozen. Thus enabling the ability to count cycles during the period of time associated with exception processing for one or more interrupt event types. After the interrupt processing is completed, the timer may return to the frozen state, and at some later period of time, the timer value may be inspected to determine the number of cycles spent in exception processing activities. In prior art systems, this task involves many uncertainties, since many cycles can be spent in processing the exception in preparation for entering the interrupt handler, in addition to the timing delay introduced by performing explicit timer control via instruction means within the interrupt handler. Also, in many processing systems, the interrupt handlers are unaware of timer resources and cannot be modified to accommodate such measurements.

The timer configurations can be determined during the design of the processing device, by a device manufacturer who implements the processing device, or by a user of the processing device. To illustrate, a designer may determine the appropriate timer configurations and hard-code them into the architecture of the processing device. Alternately, the timer control configurations may be determined by a compiler or programmer for an implementation of the processing device.

At block 204, the method 200 includes configuring the timer control criteria 128 to include information representative of the timer configurations determined at block 202. In one embodiment, the timer control criteria 128 can be implemented as programmable control registers, such as the IFTCR register and the IUFTCR register described above. In this instance, configuring the timer control criteria 128 can include writing data values to the control registers, the data values representative of the desired timer configurations. The write operation to the control registers may be privileged and therefore can only be performed by an operating system or hypervisor. Alternately, the end user can incorporate configuration of the timer control criteria 128 into a user application, such as a processor profiling application. In another embodiment, the timer control criteria 128 can be implemented as a hard-coded control that cannot be modified, such as via implementation in read-only memory (ROM) and the like.

FIG. 3 illustrates a method 300 for selective timer control in response to an exception in accordance with at least one embodiment of the present disclosure. For ease of discussion, the method 300 is described in the context of the processing device 100 of FIG. 1.

At block 302, an exception is received at the exception controller 118. The exception can be invoked from a variety of sources, such as the execution unit 134, the data MMU 106, the instruction MMU 108, or the external interface 110, and for a variety of reasons, such as cache locking, parity errors, interrupts from user interfaces (e.g., a keyboard or a mouse), storage interrupts, external device interrupts, and the like Only a single exception typically can be processed for interrupt invocation at a time, but in many instances more than one exception may be pending at any given time. Accordingly, at block 304, the exception controller 118 prioritizes the exceptions that have occurred and have not yet been processed and selects the exception with the highest priority. Any of a variety of characteristics of the exception can be utilized by the exception controller 118 to prioritize the exception, such as an explicit priority identifier, the exception source, the exception type, and the like.

At block 306, the exception controller 118 generates a selected exception indicator 148 for the exception selected at block 304 and provides the selected exception indicator 148 to both the exception processing component 136 and the timer controller 120.

At block 308, the exception processing component 136 generates an interrupt 150 in response to the selected exception indicator 148 and selects an interrupt handler routine based on the selected exception indicator 148. The exception processing component 136 then saves the current context of the instruction pipeline 102 and initiates the selected interrupt handler routine. In response to initiation of the interrupt handler routine, the instruction pipeline 102 fetches instructions of the selected interrupt handler routine for processing and execution at the instruction pipeline so as to handle the exception represented by the interrupt.

The processing of the interrupt 150 continues at block 310 until the interrupt handler routine finishes. In response to termination of the interrupt handling routine (e.g., after execution of the last instruction of the interrupt handler routine), the exception processing component 136 restores the prior context of the instruction pipeline 102 and generates an interrupt return indicator 170 at block 312. The instruction pipeline 102 then returns to executing instructions associated with the normal program flow.

At block 314, the timer controller 120 determines the applicable characteristics of the exception represented by the selected exception indicator 148 provided at block 306. Depending on the relevant timer control criteria 128, the characteristics of the exception information can include, for example, the exception type (e.g., parity error), the exception source (e.g., data cache), the interrupt handler routine to be invoked by the exception, and the like.

At block 316, the timer controller 120 determines which of the timers 122-126 is to be selectively enabled or disabled in response to the exception characteristics utilizing the timer control criteria 128. To illustrate, the timer control criteria 128 can be implemented as the IFTCR register and IUFTCR registers described with reference to Tables 1 and 2. Accordingly, the timer controller 120 can access the associated bit of the IFTCR and IUFTCR registers corresponding to the exception type to determine whether the corresponding timers are to be enabled or disabled.

At block 318, the timer controller 120 selectively enables/disables the timers 122-126 based on the timer configurations determined at block 316 by configuring the enable/disable signals 152-156, accordingly. If the timer controller 120 determines that a timer is to be disabled, the timer controller 120 can deassert the associated timer enable/disable signal, thereby placing the corresponding timer in a disabled, or "frozen", state. Conversely, if a timer is to be enabled, the timer controller 120 can assert the corresponding enable/disable signal, thereby placing the corresponding timer in an enabled, or "unfrozen" state.

In response to the interrupt return indicator 170 generated at block 312, at block 320 the timer controller 120 determines the timer configurations for the timers 122-126 from the timer control criteria 128 corresponding to the characteristics of the exception represented by the interrupt return indicator 170. At block 322, the timer controller 120 configures the timers 122-126 by selectively enabling/disabling the timers 122-126 in accordance with the timer configurations determined at block 320. As discussed with reference to block 318, an enable/disable signal for an associated timer can be asserted or negated based on the configuration information.

In one embodiment, performance measurements can be determined from the timer count information accessed via the processor device 100 or for external use via the debug interface 130 and the peripheral device 116 before, during, or after the process represented by method 300. By enabling programmable configuration of the enable states of the timers 122-126 during the processing of exceptions, a designer, tester, or user can obtain a more accurate model of the performance of the processing device.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A processing device comprising:
   a first timer;
   an exception controller configured to provide a first exception indicator representative of a first exception;
   an instruction pipeline configured to execute an interrupt handler routine in response to the first exception indicator;
   a timer controller configured to selectively enable/disable the first timer in response to a termination of execution of the interrupt handler routine; and
   a timer control criteria storage component configured to store a configuration data for the first timer, the configuration data indicating a corresponding timer configuration for the first timer for each of a plurality of exception characteristics, the first exception having a select exception characteristic of the plurality of exception characteristics, and the configuration data including a first configuration data representing whether the first timer is to be enabled for each of the plurality of exception characteristics and a second configuration data representing whether the first timer is to be disabled for each of the plurality of exception characteristics; and
   wherein the timer controller is configured to selectively enable/disable the first timer by:
      determining a timer configuration for the first timer corresponding to the select exception characteristic from the configuration data; and
      selectively enabling/disabling the first timer based on the timer configuration.

2. The processing device of claim 1, wherein the first timer is selected from a group consisting of: a watchdog timer; a decrement timer; and a time-base timer.

3. The processing device of claim 1, wherein the timer controller further is configured to selectively enable the first timer based on an exception type of the first exception.

4. The processing device of claim 1, wherein:
the instruction pipeline is configured to provide an interrupt return indicator at the termination of the execution of the interrupt handler routine; and
the timer controller is configured to selectively enable/disable the first timer in response to the interrupt return indicator and based on a characteristic of the interrupt handler routine.

5. The processing device of claim 1,
wherein the first timer has a predetermined enable state prior to the first exception and the timer controller is configured to selectively enable/disable the first timer to return the first timer to the predetermined enable state in response to the termination of execution of the interrupt handler routine.

6. The processing device of claim 1, further comprising:
a second timer; and
wherein the timer controller is configured to selectively enable/disable the second timer based on the a characteristic of the first exception, the characteristic comprising at least one of an exception type of the first exception, the interrupt handler routine invoked in response to the first exception indicator, and a source of the first exception.

7. The processing device of claim 1, wherein:
the exception controller is configured to provide a second exception indicator representative of a second exception; and
the timer controller is configured to selectively enable/disable the first timer in response to the second exception indicator and based on a second characteristic of the second exception.

8. The processing device of claim 1, wherein the timer controller further is configured to selectively enable the first timer based on a source of the first exception.

9. A method comprising:
receiving a first exception at a processing device;
determining a first characteristic of the first exception;
storing configuration data for a first timer at the processing device, the configuration data indicating a corresponding timer configuration for the first timer for each of a plurality of exception characteristics, the first exception having a select exception characteristic of the plurality of exception characteristics, and the configuration data including a first configuration data representing whether the first timer is to be enabled for each of the plurality of exception characteristics and a second configuration data representing whether the first timer is to be disabled for each of the plurality of exception characteristics;
at a first time, determining a first timer configuration for the first timer corresponding to the first exception characteristic from the configuration data and selectively enabling/disabling the first timer of the processing device based on the first timer configuration;
executing an interrupt handler routine at the processing device in response to the first exception;
at a second time subsequent to the first time, accessing a first count value stored at the first timer in response to termination of the interrupt handler routine; and
providing the first count value for output from the processing device.

10. The method of claim 9, further comprising:
determining a performance characteristic of the processing device based on the first count value provided for output from the processing device.

11. The method of claim 9, further comprising:
at a third time subsequent to the first time and prior to the second time, selectively enabling/disabling the first timer in response to termination of the execution of the interrupt handler routine.

12. The method of claim 11, further comprising:
providing an interrupt return indicator at the termination of the execution of the interrupt handler routine; and
wherein selectively enabling/disabling the first timer in response to termination of the execution of the interrupt handler routine comprises selectively enabling/disabling the first timer in response to the interrupt return indicator and based on a characteristic of the interrupt handler routine.

13. The method of claim 11, wherein:
the first timer has a predetermined enable state prior the first exception; and
selectively enabling/disabling the first timer in response to termination of the execution of the interrupt handler routine comprises selectively enabling/disabling the first timer to return the first timer to the predetermined enable state.

14. The method of claim 9, further comprising:
at the first time, selectively enabling/disabling a second timer of the processing device in response to the first exception.

15. The method of claim 9, further comprising:
receiving a second exception at the processing device;
determining a second characteristic of the second exception;
at a third time subsequent to the first time and prior to the second time, selectively enabling/disabling the first timer based on the second characteristic;
at the second time, accessing a second count value stored at the first timer; and
providing the second count value for output from the processing device.

16. The method of claim 9, wherein the first characteristic is an exception type of the first exception.

17. The method of claim 9, wherein the first characteristic is a source of the first exception.

* * * * *